(12) United States Patent
Shimizu et al.

(10) Patent No.: US 10,625,940 B2
(45) Date of Patent: Apr. 21, 2020

(54) CONSTRUCTION MATERIAL MANAGEMENT SYSTEM AND CONSTRUCTION MATERIAL MANAGEMENT METHOD

(71) Applicant: CHIYODA CORPORATION, Yokohama-shi, Kanagawa (JP)

(72) Inventors: Naoki Shimizu, Yokohama (JP); Hiroyuki Iwamoto, Yokohama (JP); Yasuyuki Maeda, Yokohama (JP); Eiji Takahashi, Yokohama (JP); Takayuki Naito, Yokohama (JP)

(73) Assignee: CHIYODA CORPORATION, Yokohama (JP)

( * ) Notice: Subject to any disclaimer, the term of this patent is extended or adjusted under 35 U.S.C. 154(b) by 0 days.

(21) Appl. No.: 15/759,443

(22) PCT Filed: Aug. 30, 2016

(86) PCT No.: PCT/JP2016/075273
§ 371 (c)(1),
(2) Date: Mar. 12, 2018

(87) PCT Pub. No.: WO2017/043363
PCT Pub. Date: Mar. 16, 2017

(65) Prior Publication Data
US 2018/0186571 A1 Jul. 5, 2018

(30) Foreign Application Priority Data
Sep. 10, 2015 (JP) ................................. 2015-178166

(51) Int. Cl.
*B65G 1/137* (2006.01)
*G06Q 50/08* (2012.01)
(Continued)

(52) U.S. Cl.
CPC .......... *B65G 1/1371* (2013.01); *B66F 9/0755* (2013.01); *B66F 9/24* (2013.01);
(Continued)

(58) Field of Classification Search
None
See application file for complete search history.

(56) References Cited

U.S. PATENT DOCUMENTS 9,280,757 B2 * 3/2016 Parpia .................. G06Q 10/087

FOREIGN PATENT DOCUMENTS

JP 2006-221529 A 8/2006
JP 2007108799 * 4/2007 ............. B65G 1/137
(Continued)

OTHER PUBLICATIONS

Nov. 22, 2016 International Search Report issued in International application No. PCT/JP2016/075273.
(Continued)

*Primary Examiner* — Allen C Chein
*Assistant Examiner* — Denisse Y Ortiz Roman
(74) *Attorney, Agent, or Firm* — Oliff PLC

(57) ABSTRACT

A system and a method which allow an easy shipment and receipt of construction materials and an easy retrieval of the same, as well as an easy acquisition of position information of construction materials. The system includes: an identification information holding medium which holds identification information of the construction material; a moving body that acquires first position information which is position information of the moving body and also acquires identification information; material data storage unit for storing the first position information in association with the identification information; and retrieval unit for retrieving the identification information in the material data storage unit. The display unit displays the first position information associated
(Continued)

with the identification information retrieved by the retrieval unit. Therefore, it is easy to perform shipment and receipt of construction materials, easily retrieve construction materials, and it is also easy to acquire position information of construction materials.

10 Claims, 9 Drawing Sheets

(51) Int. Cl.
*B66F 9/24* (2006.01)
*G06Q 10/08* (2012.01)
*B66F 9/075* (2006.01)
*G05B 19/418* (2006.01)
*G01C 11/02* (2006.01)
*G06Q 10/06* (2012.01)

(52) U.S. Cl.
CPC ....... *G05B 19/4183* (2013.01); *G06Q 10/087* (2013.01); *G06Q 50/08* (2013.01); *G01C 11/02* (2013.01); *G06Q 10/0637* (2013.01)

(56) References Cited

FOREIGN PATENT DOCUMENTS

| JP | 2008-265909 A | | 11/2008 |
|----|---------------|---|---------|
| JP | 2012128515 | * | 12/2010 |
| JP | 2012-128515 A | | 7/2012 |

OTHER PUBLICATIONS

Nov. 22, 2016 Written Opinion in International application No. PCT/JP2016/075273.
Apr. 16, 2019 Office Action issued in Japanese Patent Application No. 2015-178166.

* cited by examiner

| | Progress Information | Identification Code | Size | Quantity | Descriptions |
|---|---|---|---|---|---|
| 1 | Welding Finished | A | | 1 | Spool |
| 2 | Temporary Stopping Finished | B | | 1 | Spool |
| 3 | Stored in Material Storage Location | C | | 1 | Spool |
| 4 | Stored in Material Storage Location | D | | 1 | Spool |
| 5 | Stored in Material Storage Location | 1A100B | 10 | 100 | Pipe |
| 6 | During Transportation | 3B200D | 1 | 1 | Nipple |
| ... | ... | | | | |

FIG.6

CONSTRUCTION MATERIAL MANAGEMENT SYSTEM AND CONSTRUCTION MATERIAL MANAGEMENT METHOD

TECHNICAL FIELD

The present invention relaxes to a system for managing construction materials and a method for managing construction materials.

BACKGROUND ART

Large-scale construction work such as construction of plant requires a huge amount of construction materials. To manage such huge amount of construction materials, various techniques have been suggested for attaching bar codes or RFID tags holding identification information of construction materials to construction materials and for managing the construction materials.

For example, patent document 1 discloses a management system in which a terminal device for reading barcode or RFID is provided in a storage location or the like of construction material, and when construction material is received into or snipped from the storage location or the like, identification information and position information of the construction material are acquired and stored in database to manage movement history of construction materials.

In a conventional system, it is possible to retrieve and identify which material storage location has stored target construction material. Also, if detailed location information is acquired in advance when construction material has arrived, even if the material storage place is very large, it is still possible to thereafter retrieve position information to efficiently find target construction material.

CITATION LIST

Patent Literature

Japanese Unexamined Patent Application Publication No. 2006-221529.

SUMMARY OF THE INVENTION

Problems to be Solved by the Invention

However, in a conventional system, it is necessary to read the identification information and the position information at the time of cargo arrival or cargo shipping-out, and it takes time and effort in receiving cargo or cargo shipping-out. Also, if the construction material is moved within a material storage place after it arrives at the material storage location, it will take time to search around in a large material storage location and take time and effort in finding desired construction material. To avoid this, if a terminal device is used to acquire the position information every time the construction material is moved, it still takes time and effort in acquiring the position information of the construction material.

The present invention has been accomplished in view of the above-described circumstances, and has provided a system and a method that facilitate cargo arrival and shipping-out, making it easy to find target construction material, and easily obtain position information of construction material.

Solution to Problem

In achieving the above object, the construction material management system of the present invention includes: an identification information holding medium that is attached to construction material and holds identification information for identifying construction material; a moving body that moves around an area surrounding a construction material storage location; a management computer; and a display unit.

The moving body includes: a first position information acquiring unit that acquires first position information which is position information of the moving body; and a first identification information acquiring unit that, while moving around the storage location, acquires identification information via wireless communication from the identification information holding medium.

The management computer includes: material data storage unit for storing the first position information acquired by the first position information acquiring unit in association with the identification information; and retrieval unit for retrieving the identification information in the material data storage unit.

The display unit displays the first position information associated with the identification information retrieved by the retrieval unit.

Further, the present invention provides a construction material management method, wherein: a moving body moves around a storage location of construction material; a first identification information acquiring unit provided in the moving body acquires the identification information via wireless communication from an identification information holding medium attached to the construction material for holding the identification information for identifying the construction material; a first position information acquiring unit provided in the moving body acquires first position information that is position information of the moving body; material data storage unit stores the first position information acquired by the first position information acquiring unit, in association with the identification information; and retrieval unit retrieves the identification information in the material data storage unit, while the display unit displays the first position information associated with the retrieved identification information.

In the present invention, while the moving body is moving around an area including the storage location of the construction material, the first identification information acquiring unit of the moving body acquires via wireless communication the identification information held by the identification information holding medium attached to the construction material. At this time, the first position information acquiring unit acquires the first position information, and this first position information is stored in the material data storage unit in association with the identification information. Then, the retrieval unit retrieves the identification information in the material data storage unit, and the display unit displays the first position information associated with the identification information.

Therefore, since there is no need for reading the identification information and the position information at the time of cargo shipment or arrival, it is easy to perform shipment and receiving operations, and it is easy to obtain the latest position information of each construction material at a necessary time, thus making it easy to find desired construction material based on this latest position information.

Further, the construction material management system of the present invention is such that the system includes: an image acquiring/moving body that flies around the storage location of the construction material; a material map preparing unit; and a material map storage unit.

The image acquiring/moving body includes: a second position information acquiring unit that acquires second position information which is the position information of the image acquiring/moving body, while the image acquiring/moving body is flying around the storage location of the construction material; and a first image acquiring unit that acquires an image of the construction material or an image of a surrounding area including the storage location of the construction material.

The material map preparing unit prepares a material map by associating the second position information or position information calculated from the second position information with said image or a combined image prepared by combining a plurality of said images; the material map storage unit stores this material map.

The display unit displays the first position information stored in association with the identification information retrieved by the retrieval unit, in association with the material map.

Moreover, the configuration of the present invention is such that: the image acquiring/moving body flies around the storage location of the construction material; a second position information acquiring unit provided in the image acquiring/moving body acquires second position information which is position information of the image acquiring/moving body; a first image acquiring unit provided in the image acquiring/moving body acquires a first image which is an image of an area surrounding the storage location of construction material or an image of the construction material; a material map preparing unit combines the second position information acquired by the second position information acquiring unit and the first image acquired by the first image acquiring unit to prepare a material map which is stored in the material map storage unit; and the retrieval unit retrieves the identification information in the material data storage unit and the display unit displays the first position information associated with the retrieved identification information in association with the material map.

With such a configuration, when the image acquiring/moving body is flying around an area including the storage location of the construction material, the first image acquiring unit provided in the image acquiring/moving body acquires an image, and the second position information acquiring unit acquires the second position information.

The material map preparing unit associates the above image with the second position information or the position information calculated from the second position information by the material map preparing unit. Alternatively, the material map preparing unit combines a plurality of the images to prepare a single combined image, associates the combined image with the second position information or the position information calculated from, the second position information by the material map preparing unit, thereby preparing the material map and storing the material map in the material map storage unit.

Then, the retrieval unit retrieves the identification information in the material data storage unit, and the display unit displays the first position information associated with the identification information, in association with the material map.

Therefore, the position of the construction material can be confirmed on the material map, and the construction material can be found more efficiently than when there is no material map.

Further, in the above configuration of the present invention, it is preferable that the system comprises diagram storage unit for storing the CAD diagram and the element diagram to be used in the CAD diagram, and the diagram associating unit for associating the element diagram with the identification information, and that the retrieval unit retrieves the identification information associated with the element diagram, and further that the display unit displays the first position information associated with the identification information retrieved by the retrieval unit.

Further, in the above configuration of the present invention, it is preferable that the diagram associating unit associates the element diagram used in the CAD diagram stored in the diagram storage unit with the identification information, the retrieval unit retrieves the identification information associated with the element diagram, and the display unit displays the first position information associated with the retrieved identification information.

According to such a configuration, the diagram associating unit associates the CAD diagram stored in the diagram storage unit and the element diagram to be used in the CAD diagram with the identification information. Then, the retrieval unit retrieves the identification information associated with the element diagram being used in the CAD diagram, and the display unit displays the first position information associated with the identification information.

Therefore, it is possible to confirm the position information of an arbitrary construction material from the CAD diagram.

Further, in the above configuration of the present invention, it is preferable that the system comprises a terminal that includes a second, identification information acquiring unit for acquiring the identification information from, the identification information holding medium and a progress information input unit for inputting progress information of the construction work, and that the material data storage unit stores the progress information in association with the identification information, and further that the display unit displays the progress information associated with the identification information retrieved by the retrieval unit.

Moreover, the present invention is such that: a second identification information acquiring unit provided in a terminal acquires the identification information from the identification information holding medium; progress information input unit provided in the terminal inputs the progress information of the construction work; material data storage unit stores the progress information inputted by the progress information input unit in association with the identification information; and display unit displays the progress information associated with the identification information retrieved by the retrieval unit.

According to such a configuration, the second identification information acquiring unit acquires the identification information from the identification information holding medium attached to the construction material, the progress information input unit inputs the progress information concerning the construction material having the identification information, and the material data storage unit stores the progress information in association with the identification information stored in the material data storage unit. Then, the retrieval unit retrieves the identification information, and the display unit displays the progress information associated with the identification information.

Therefore, even after the construction material has been used in construction, it is still possible to examine what construction work in which the construction material was used and to store related information. In addition, it is possible to ascertain a progress situation and help to identify construction materials necessary for the next construction work.

Further, in the above configuration of the present invention, it is preferable that the system comprises: the diagram storage unit for storing the CAD diagram and the element diagram to be used in the CAD diagram; diagram associating unit for associating said element diagram with said identification information; and a terminal including a second identification information acquiring unit for acquiring the identification information from the identification information holding medium; and progress information input unit for inputting the progress information of the construction work.

It is further preferable that the material data storage unit stores the progress information in association with the identification information, the retrieval unit retrieves the identification information associated with the element diagram, the display unit changes color of the element diagram and displays the CAD diagram in accordance with the progress information associated with the retrieved identification information.

Further, the present invention is such that: a diagram associating unit associates an element diagram to be used in the CAD diagram stored in the diagram storage unit with the identification information; a second identification information acquiring unit provided in a terminal acquires the identification information from the identification information holding medium; progress information input unit provided in the terminal inputs progress information; material data storage unit stores the progress information inputted by the progress information input unit in association with the identification information; retrieval unit retrieves the identification information associated with the element diagrams stored in the diagram storage unit; and display unit changes the color of the element diagram and displays the CAD diagram in accordance with the progress information associated with the retrieved identification information.

According to such a configuration, the diagram associating unit associates the CAD diagram stored in the diagram storage unit and the element diagram to be used in the CAD diagram with the identification information. Further, the second identification information acquiring unit acquires the identification information, the progress information input unit inputs the progress information concerning the construction material having the identification information, and the material data storage unit associates the progress information with the identification information.

Then, the retrieval unit retrieves the identification information associated with the element diagram being used in the CAD diagram, changes the color of the element diagram and displays the CAD diagram in accordance with the progress information associated with the identification information. In addition, the retrieval unit retrieves the identification information associated with the element diagram being used in the CAD diagram, and the display unit displays the first position information associated with the identification information.

Therefore, it is possible to visually recognize progress information from the CAD diagrams, and efficiently and accurately ascertain the progress situation. In addition, it is possible to efficiently identify construction materials necessary for the next construction work.

Further, in the above configuration of the present invention, it is preferable that the terminal includes a second image acquiring unit that acquires a second image which is an image of the construction material, the material data storage unit stores the second image acquired by the second image acquiring unit in association with the identification information, and the display unit displays the second image associated with the identification information retrieved by the retrieval unit.

Further, in the above configuration of the present invention, it is preferable that the material data storage unit stores a second image which is an image of the construction material acquired by the second image acquiring unit provided in the terminal, in association with the identification information. It is further preferable that the display unit displays the second image associated with the identification information retrieved by the retrieval unit.

With such a configuration, the second identification information acquiring unit acquires the identification information, and the material data storage unit stores, in association with the identification information, the progress information inputted by the progress information input unit and the second image acquired by the second image acquiring unit. Then, the retrieval unit retrieves the identification information, and the display unit displays the progress information and the second image associated with the identification information.

Therefore, it is possible to confirm the progress situation on the image and confirm the input error or the like of the progress information.

Effects of the Invention

According to the present invention, it is easy to perform operations for cargo arrival and cargo shipping-out, find target construction material, and obtain position information of construction material.

BRIEF DESCRIPTION OF DIAGRAMS

FIG. 6 is a diagram showing the structure of a material table.

DESCRIPTION OF EMBODIMENTS

Embodiments of the present invention will be described below with reference to the accompanying diagrams.

Figure 1:
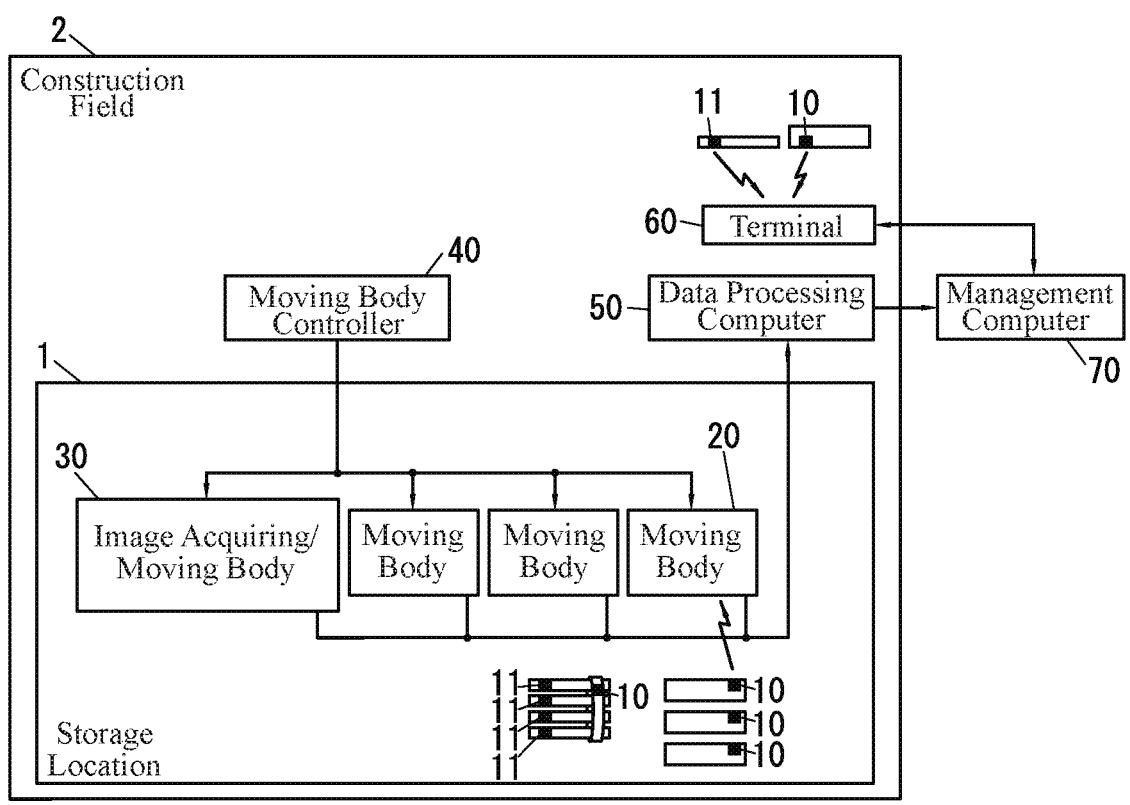
FIG. 1 is a block diagram showing a construction material management system according to an embodiment of the present invention, illustrating the structure of a whole system.

As shown in FIG. 1, the construction material management system of the present embodiment includes an identification information holding medium 10, a moving body 20, an image acquiring/moving body 30, a moving body controller 40, a data processing computer 50, a terminal device 60, and a management computer 70.

The identification information holding medium 10 is an RFID tag that holds identification information 100 for identifying construction material and is attached to construction, material. Depending on individual construction materials, only one identification information holding medium 10 is attached to one construction material, or two or more same identification information holding media 10 are attached to one construction material. For example, for a long construction material, one identification information medium is attached to each end of the construction material.

Further, a plurality of construction materials in the same form may be collectively put into a group of construction materials, and one identification information holding medium 10 may be attached to this group of construction materials. At this time, an auxiliary information holding medium 11 having a colored barcode holding an auxiliary information 110 associated with an identification information 100 held by the identification information holding medium 10 attached to this group of construction materials, is attached to each construction material included in this group of construction materials, thus effecting a quantity management by virtue of the auxiliary information holding medium 11.

However, it should be noted that the identification information holding medium 10 or the auxiliary information holding medium 11 is not limited to the above-mentioned information holding form, and it is also possible to use other one-dimensional code or two-dimensional code. In this case, a method of obtaining the identification information 100 or the auxiliary information 110, which, will be described later, can be replaced according to the information holding form of the identification information holding medium 10 or the auxiliary information holding medium 11.

Figure 2:
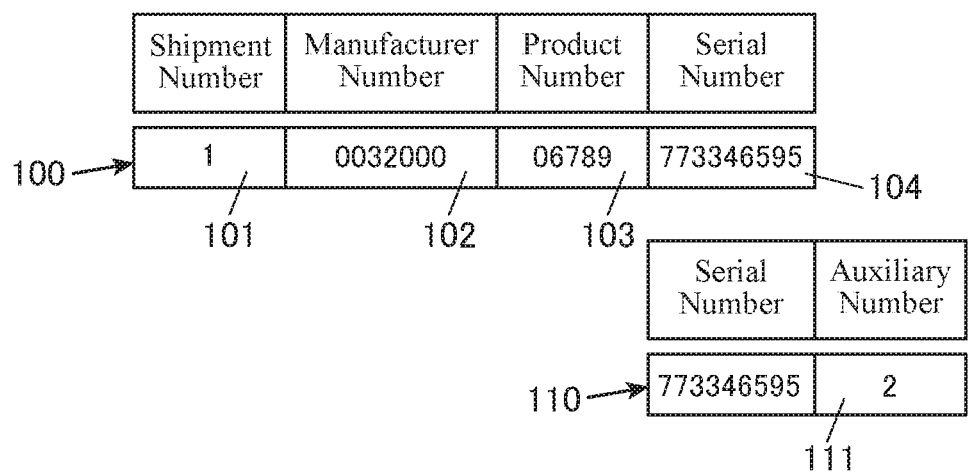
FIG. 2 is a diagram showing the structure of identification information and auxiliary information.

As shown in FIG. 2, the identification information 100 includes a shipment number 101, a manufacturer number 102, a product name number 103, and a serial number 104. The shipment number 101 is the same number as given, to the construction materials shipped or manufactured at the same time. Manufacturer number 102 is a number indicating a factory that has manufactured a construction material or a company which owns the factory. The product name number 103 is a number indicating the type of a construction, material. The serial number 104 is a number uniquely assigned to construction materials of the same form.

The auxiliary information 110 is composed of a serial number 104 and an auxiliary number 111. The auxiliary number 111 is a number indicating at what serial number a certain product was manufactured among construction materials of the same type having obtained the same identification information 100.

The moving body 20 and the image acquiring/moving body 30 are wirelessly controlled by the moving body controller 40 to fly and move around an area including a storage location 1 of construction material. The flying movement may be effected by registering a flight route in the moving body controller 40 in advance, followed, by carrying out the flying movement in accordance with the flight route. Alternatively, the flying movement may be manually controlled by the moving body controller 40 while a human operator directly monitors the moving body 20 or the image acquiring/moving body 30. In addition, the flying movement may also be manually controlled by the moving body controller 40 by at first providing a camera in the moving body 20 or the image acquiring/moving body 30, followed by performing the flying movement while monitoring the camera image on the camera image display unit. Further, it is also possible for a first image acquiring unit 32 provided, in the image acquiring/moving body 30 to serve as this camera.

The moving body 20 and the image acquiring/moving body 30 may be, for example, a wireless steering multicopter, a wireless steering helicopter, a wireless steering airplane, a wireless steering airship, each having a length from several centimeters to several meters in total.

However, it should be noted that the moving body 20 may be a non-flying unit which moves on land by, for example, tires, crawlers, legs, or the like, instead of being a flying unit. Also, the image acquiring/moving body 30 is not limited to a flying unit, but may be a unit which moves on land.

Figure 3:
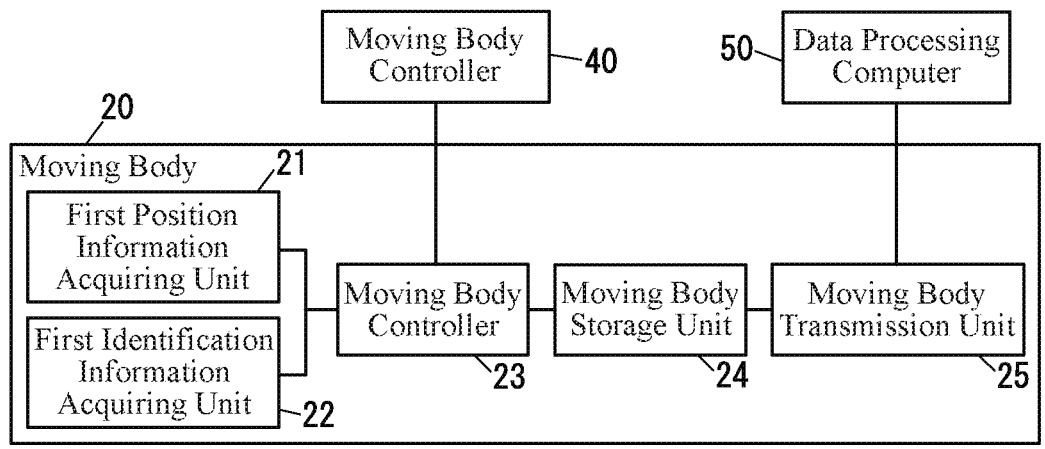
FIG. 3 is a block diagram showing internal structures of a moving body and an image acquiring/moving body.
Figure 3:
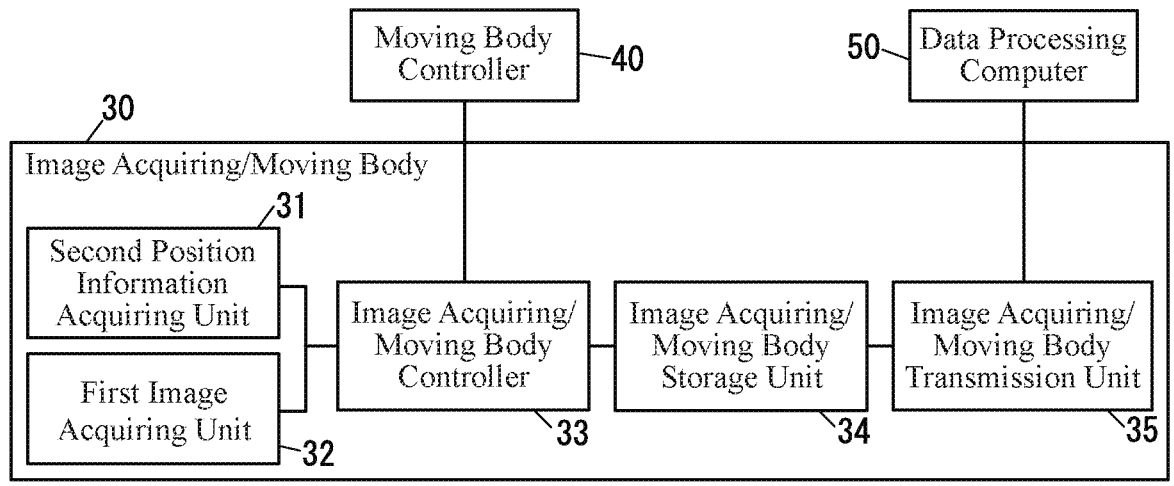

As shown in FIG. 3, the moving body 20 includes a first position information acquiring unit 21, a first identification information acquiring unit 22, a moving body control unit 23, a moving body storage unit 24, a moving body transmission unit 25.

The first position, information acquiring unit 21 receives a signal transmitted from, the GPS (Global Positioning System) satellite and performs a position measurement, to acquire a first position information which is information indicating the current, position of the moving body 20. The first identification information acquiring unit 22 is an RFID reader, and acquires the identification information 100 from the identification information holding medium 10. Acquisition of the first position information by the first position information acquiring unit 21 and acquisition of the identification information 100 by the first identification information acquiring unit 22 are performed in synchronization.

The moving body control unit 23 has a time identification function and specifies a time at which the first position information and the identification information 100 are acquired, in synchronization with each other, and stores the first position information, the identification information 100, and acquired time in association with each other in the moving body storage unit 24. Further, the moving body control, unit 23 receives a control signal from the moving body controller 40 and controls a flight movement of the moving body 20.

The moving body transmission unit 25 transmits the first position information, the identification information 100, and the time at which those information was acquired in the moving body storage unit 24, as well as a time at which those information was acquired, to the data processing computer 50 while maintaining the association.

As shown in FIG. 3, the image acquiring/moving body 30 includes a second position information acquiring unit 31, a first image acquiring unit 32, an image acquiring/moving body control unit 33, an image acquiring/moving body storage unit 34, an image acquiring/moving body transmission unit 35.

The second, position information acquiring unit 31 receives a signal transmitted from GFS satellite and performs a positioning to acquire the second position information that is the information indicating the current positron of the image acquiring/moving body 30. The first image acquiring unit 32 is a camera for photographing a still image and acquires a first image which is an image obtained by photographing storage location 1, the surrounding area of the storage location 1, and construction materials from the above. The acquiring of the second position information by the second position information acquiring unit 31 and the acquiring of the first image by the first image acquiring unit 32 are performed synchronously.

The image acquiring/moving body control unit 33 stores the second position information and the first image in association with each other in the image acquiring/moving body storage unit 34. Also, the image acquiring/moving body control unit 33 receives a control signal from the moving body controller 40 and controls the flight movement of the image acquiring/moving body 30.

The image acquiring/moving body transmission unit 35 transmits the second position information and the first image stored in the image acquiring/moving body storage unit 34 to the data processing computer 50 while maintaining the above-mentioned association.

Note that the moving body 20 and the image acquiring/moving body 30 may be integrated with each other. That is, the moving body 20 may include the second position information acquiring unit 31 and the first image acquiring unit 32. In addition, the first position information acquiring unit 21 may also serve as the second position information acquiring unit 31.

However, although it is possible that only one moving body 20 or only one image acquiring/moving body 30 is provided, it is also possible that a plurality of such moving bodies may be provided. In addition, it is possible that the storage location 1 may include a plurality of places scattered separately, rather than having only one storage location. Particularly, where the number of construction materials is enormous and the area of storage location 1 is large, it is preferable to divide the storage location 1 into several areas and to provide the moving body 20 or the image acquiring moving body 30 to each area. Also, the number of moving body 40 does not have to be only one, but each area can have one moving body 40.

Figure 4:
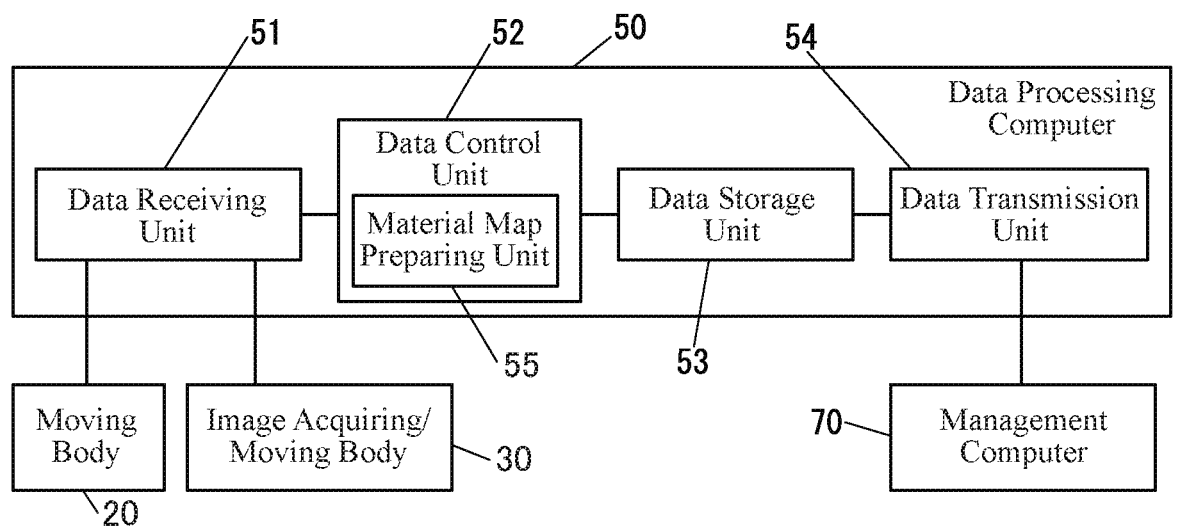
FIG. 4 is a block diagram showing an internal structure of a data processing computer.

As shown in FIG. 4, the data processing computer 50 includes a data receiving unit 51, a data control unit 52, a data storage unit 53, and a data transmission unit 54.

The data receiving unit 51 receives information transmitted from the moving body transmission unit 25 and the image acquiring/moving body transmission unit 35 via wired communication or wireless communication.

The data control unit 52 includes a material map preparing unit 55. The material map preparing unit 55 prepares one combined image obtained by combining a plurality of first images received by the data receiving unit 51. The material map preparing unite 55 prepares a combined image without a distortion in the combined, portion of the first image, by applying orthorectification to the combined image or the first image when or before preparing such combined image. Here, regarding orthorectification, an image captured by the camera is a central projection image, and a distortion occurs in the image due to a difference in distance from the camera to the object. In fact, orthorectification refers to a correction that corrects the distortion and converts a ground surface image into an image viewed from directly above.

Note that the orthorectification may be performed inside the image acquiring/moving body 30. That is, before or after storing the first image in the image acquiring/moving body storage unit 34, the image acquiring/moving body control unit 33 or the like may perform orthorectification on the first image.

In addition, the material map preparing unit 55 calculates position information on the combined image from the second position information associated with each first image, and associates the calculated position information with an arbitrary point on the combined image, thus preparing a material map. For example, by considering the second position information associated with the first image as the position information of the center point of the first image, and by keeping the second position information when combining the first image, the second position information associated with the first image forming the source of the combined image is caused to be associated with the combined image. Then, the position information of an arbitrary point in the combined image is calculated from the point in which the second position information associated with the first image forming the source of three or more combined images surrounding the arbitrary point.

Note that an image of the material map may be one first image rather than a combined image. For example, a first image is acquired from a height of several tens of meters in the sky by using the first image acquiring unit 32, while the position information calculated from the second position information, by the material map preparing unit 55 is associated with an arbitrary point of the first image. A calculation method may be, for example, a method in which the image acquiring/moving body 30 is provided with unit for measuring and calculating the distance of a range displayed by the first image, and the second position information associated with the first image is deemed to be position information of the center point of the first image Information, followed, by calculating the position information of an arbitrary point of the first image from the position information of the center point and the distance information of the range shown by the first image obtained by measurement and calculation.

Further, the first image itself, which is transmitted from, the image acquiring/moving body transmission unit 35 and is associated with the second position information, may be used as the material map.

The data control unit 52 stores the material map in the data storage unit 53. In addition, the data control unit 52 stores the first position information, the identification information 100 and a time at which the information was acquired, which have been received by the data receiving unit 51, in the data storage unit 53 while maintaining the association.

The data transmission unit 54 transmits the material map stored in the data storage unit 53 to the management computer 70 via the Internet. The data transmission unit 54 transmits the first position information, the identification information 100, and a time at which the information was acquired, which nave been stored in the data storage unit 53, to the management computer 70 via the Internet, while maintaining the association.

On the other hand, the construction field 2 provided with the moving body controller 40 and the data processing computer 50 shown in FIG. 1 includes a construction material storage site 1 and a construction site for carrying out an actual construction work. The moving body controller 40 and the data processing computer 50 may be provided anywhere within these sites, or may be provided outside the construction field 2.

However, the material map preparing unit 55 may be provided in the management computer 70. In this case, the data processing computer 50 becomes unnecessary. At this time, information is transmitted from the moving body transmission unit 25 or the image acquiring/moving body transmission unit 35 directly to the management computer 70 via the internet. Alternatively, information is transmitted from the moving body transmission unit 25 or the image acquiring/moving body transmission unit 35 to another device connectable to the Internet, and then transmitted to the management computer 70 through that device.

Figure 5:
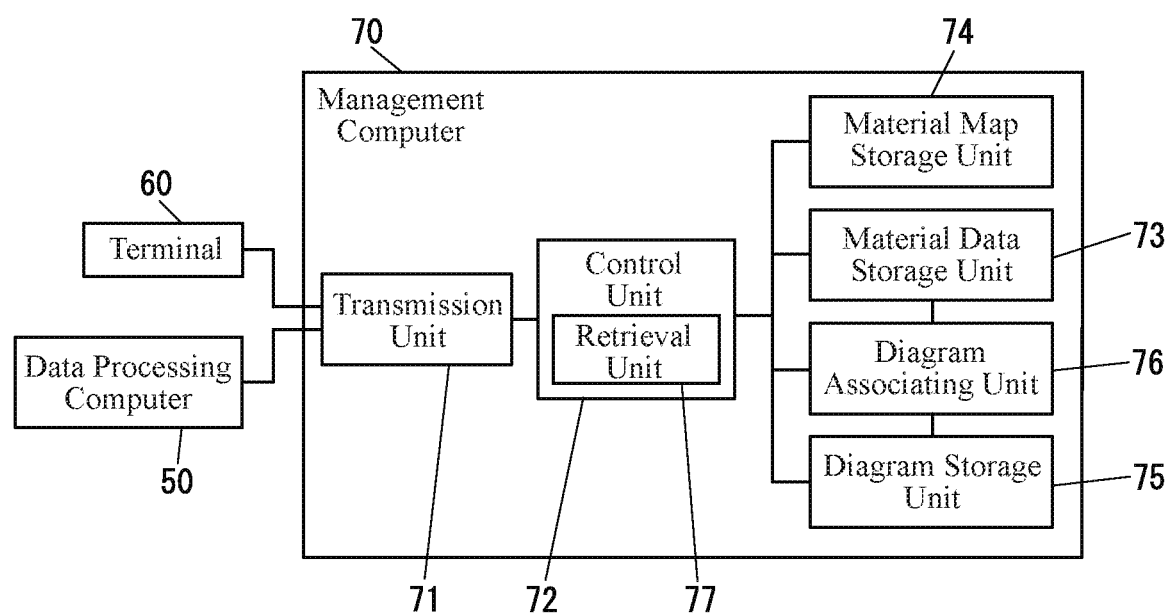
FIG. 5 is a block diagram showing an internal structure of a management computer.

As shown in FIG. 5, the management computer 70 includes a communication unit 71, a control unit 72, a material data storage unit 73, a material map storage unit 74, a diagram storage unit 75, and a diagram associating unit 76.

The material data storage unit 73 stores the identification information 100 and the auxiliary information 110 inputted by the material information input unit (not shown) provided in the management computer 70, in association with each other. Further, the material data storage unit 73 stores the material table 300.

As shown in FIG. 6, the material table 300 includes progress information 302, identification code 303, size 304, quantity 305, description 306.

The progress information 302 is information showing the progress of the construction work. The progress information 302 is entered by a human operator or other computer into the material information input unit, as "manufacturing" during the manufacturing of construction materials, or as "transporting" during the transportation to the storage location 1. The progress information 302 thus inputted is further inputted by the material information input unit into the material data storage unit 73, followed by storing the inputted progress information 302 into the material data storage unit 73 in association with the identification code 303 of the construction material.

The identification code 303 is a code associated one-to-one with each identification information 100 stored in the material data storage unit 73, or a code combining with a code associated one-to-one with the identification information 100, as well as a code associated one-to one with the auxiliary information 110. The identification code 303, together with the identification information 100, are inputted into the material information input unit by a human operator or another computer, while the identification code 303 and the identification information 100 thus inputted are inputted into the material data storage unit 73 by virtue of the material information input unit, followed by storing the inputted identification code 303 and the identification information 100 in association with each other into the material data storage unit 73.

The size 304 indicates the size of the construction material, a human operator or another computer inputs the size 304 into the material information input unit. The size 304 thus inputted is further inputted by the material information input unit into the material data storage unit 73, and stored in the material data storage unit 73 in association with the identification information 100.

The quantity 305 indicates how many construction materials having the same identification code 303 are present. For example, when 100 construction materials of the same form are collectively put into one set of construction materials and one piece of identification information 100 is given to this one set of construction materials, a human operator or another computer inputs "100" into the material, information input unit, while the material information input unit inputs the quantity information 305 indicating a number 100 into the material data storage unit 73, and stores the inputted quantity information 305 indicating a number 100 in the material data storage unit 73 in association with the identification code 303.

The description 306 corresponds to the product name number 103 and indicates the type of construction material. A human operator or another computer inputs the description 306 into the material information input unit, while the material information input unit inputs such inputted description 306 into the data storage unit 73 which then stores the description 306 in the material data storage unit 73 in association with the identification information 100.

The communication unit 71 receives the first position information, the identification information 100, a time at which the information was acquired, and material map, sent from the data transmission unit 54 via the Internet. Further, the communication unit 71 also exchanges information with the terminal 60.

The retrieval unit 77 retrieves the same identification information 100 as the identification information 100 received by the communication unit 71 from the identification information 100 stored in the material data storage unit 73. The retrieval unit 77 further retrieves the identification code 303 associated with the identification information 100. The material data storage unit 73 stores the first position information received by the communication unit 71, and a time at which the first position information and the identification information 100 were acquired in association with the identification code 303 retrieved by the retrieval unit 77. At the same time, the material data storage unit 73 rewrites the progress information 302 associated with the retrieved identification code 303 into a state in which the material has been stored in the storage location.

However, if the storage location 1 of the construction material is divided into a plurality of locations or divided into several areas, the progress information 302 may be finely divided into "stored in the first material storage location" and "stored in block A of the second material storage location". For this purpose, it is necessary to obtain information showing an area of the storage location in which the target construction material is stored. Such information may be calculated by comparing the first position information acquired by the moving body 20 to the position information showing a predetermined material storage location, or may be calculated from a flight route of the moving body 20 or a time taken for flying along the route, and the like.

The material map storage unit 74 stores the material map received by the communication unit 71.

An element diagram 201 to be used in CAD diagram 200 and CAD diagram 200 prepared by CAD diagram preparing unit (not shown) are stored in advance in the diagram storage unit 75.

The diagram associating unit 76 associates the element diagram 201 with the identification code 303. The association between the element diagram 201 and the identification code 303 by the diagram associating unit 76 is performed at the same time the diagram storage unit 75 stores the element diagram 201 or at the same time the material data storage unit 73 stores the identification code 303, whichever later should be selected.

However, it should be noted that the diagram storage unit 75 may be provided not in the management computer 70 but in another hardware.

Figure 7:
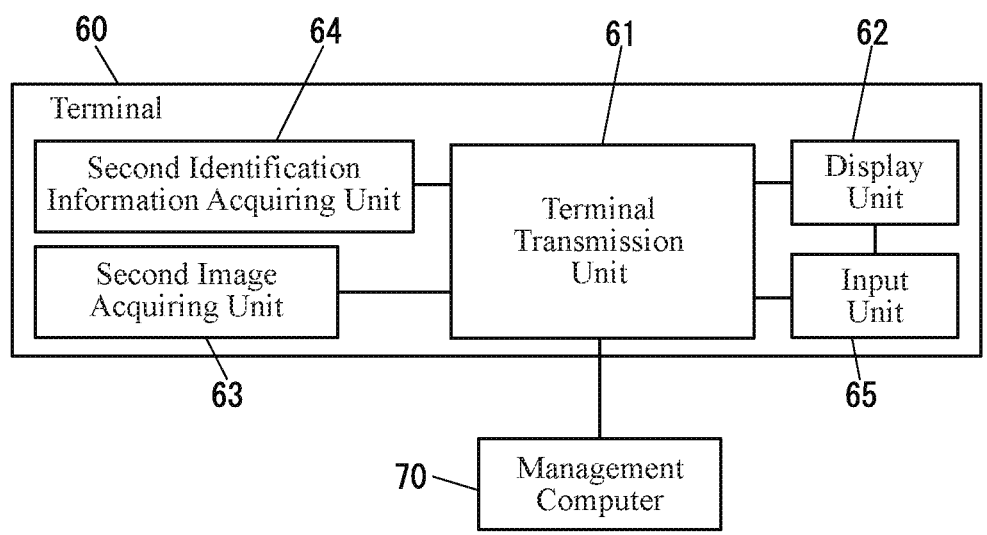
FIG. 7 is a block diagram showing an internal structure of a terminal device.

As shown in FIG. 7, the terminal 60 includes a terminal communication unit 61, a display unit 62, a second image acquiring unit 63, a second identification information acquiring unit 64, and an input unit 65.

The terminal communication unit 61 is connected to Wi-Fi base station by Wi-Fi, and is connected to the communication unit 71 via the Wi-Fi base station through the Internet.

However, it should be noted that the terminal communication unit 61 may be directly connected to the communication unit 71 via the Internet without going through the Wi-Fi base station.

The display device 62 includes a display unit and a display selection unit for selecting and displaying the information to be displayed on the display unit. The input unit 65 includes an input section for inputting commands into the terminal 60 and progress information input unit for inputting the progress information 302. The display unit and the input unit together form a touch panel as one unit.

The display unit 62 is connected, to the management computer 70 via the terminal communication unit 61 and displays, on the display unit, the CAD diagram 200 stored in the diagram storage unit 75, the material table 300 stored in the material data storage unit 73, and the material map stored in the material map storage unit 74.

The second identification information acquiring unit 64 includes an RFID reader and a color barcode reader, acquires the identification information 100 from the identification information holding medium 10, and acquires the auxiliary information 110 from the auxiliary information holding medium 11. The second image acquiring unit 63 is a camera that takes a still image and acquires a second image that is an image of a construction material.

Once the second identification information acquiring unit 64 acquires the identification information 100 or the auxiliary information 110, the terminal communication unit 61 sends the identification information 100 or the auxiliary information 110 to the communication unit 71. Then, the retrieval unit 77 receives the identification information 100 or the auxiliary information 110 received by the communication section 71 and transmitted from the terminal communication section 61

When the retrieval unit 77 has received the identification information 100 acquired by the terminal 60, the retrieval unit 77 retrieves the identification code 303 associated with the same identification information 100 as the above identification information 100 from the material data storage unit 73. When there is the auxiliary information 110 associated with the retrieved identification information 100, the display unit 62 displays a prompt to reacquire the identification information 100 or the auxiliary information 110. When there is no auxiliary information 110 associated with the retrieved identification information 100, the retrieval unit 77 retrieves the element diagram 201 associated with the identification code 303, while the display unit 62 displays the CAD diagram 200 while highlighting the retrieved element diagram 201.

The element diagram 201 highlighted by the display unit 62 is selected by the touching of a human operator, and when the element diagram 201 is selected, the display unit 62 displays a prompt to select the progress information 302.

When the retrieval unit 77 has received the auxiliary information 110 acquired by the terminal 60, the retrieval unit 77 retrieves the identification code 303 associated with the same auxiliary information 110 as the above auxiliary information 110 from the material data storage unit 73. If such retrieval is successful, the display unit 62 displays the CAD diagram 200 with highlighting the element diagram 201 associated with the identification code 303. Then, when the highlighted element diagram 201 is selected, the display unit 62 displays a prompt to select the progress information 302.

Further, the retrieval unit 77 receives the auxiliary information 110 acquired by the terminal 60, retrieves, from the material data storage unit 73, the identification code 303 associated with the same auxiliary information 110 as the above auxiliary information 110. If the identification code 303 has not been found, the retrieval unit 77 retrieves the identification code 303 associated with the identification information 100 which itself is associated with the auxiliary information 110. Then, the display unit 62 displays the CAD diagram 200 while highlighting the element diagram 201 associated with the identification code 303 retrieved by the retrieval unit 77.

When an arbitrary one of the highlighted element diagrams 201 is selected, the control unit 72 creates a code associated one-to-one with the auxiliary information 110 acquired by the terminal 60, and the control unit 72 operates such that the quantity 305 stored in the material data storage unit 73 in association with the identification code 303 associated with the selected element diagram 201 is reduced by one, while at the same time a code associated one-to-one with the auxiliary information 110 is prepared by the control unit 72. The control unit 72 further creates a new identification code 303 combined with the above code and the identification code 303 associated with the selected element diagram 201, followed by storing the new identification code 303 in the material data storage unit 73. Meanwhile, the control unit creates a quantity 305 that is 1, and the material data storage unit 73 stores the quantity 305 and the newly created identification code 303 in association with each other. At this time, the diagram associating unit 76 releases the association with the identification code 303 associated with the selected element diagram 201, and associates the selected element diagram 201 with the newly created identification code 303. When this association is completed, the display unit 62 displays a prompt to select the progress information 302.

Selection inputs of the progress information 302 may be, for example, finished welding, finished temporarily stopping, and the like which are displayed on the display unit 62. An option displayed by the display unit 62 is selected by the touch of a human operator, and the input unit 65 inputs the progress information 302 corresponding to this selection. When the input unit 65 inputs the progress information 302, the display unit 62 subsequently displays a prompt to acquire the second image.

Once a human operator confirms an indication prompting an acquisition of the second image and acquires the second image by the second image acquiring unit 63, the progress information 302 inputted by the input unit 65 and the second image acquired by the second image acquiring unit 63 are transmitted to the management computer 70, while the material data storage unit 73 stores the progress information 302 inputted by the input unit 65 and the second image acquired by the second image acquiring unit 63, in association with the identification code 303 which itself is associated with the highlighted and selected element diagram 201.

However, it is to be rioted that the terminal 60 includes a position information acquiring unit for acquiring the position information of the terminal 60, and it is possible for the second identification information acquiring unit 64 to acquire the identification information 100 or the auxiliary information 110, while at the same time acquiring the position information by the position information acquiring unit.

The position information acquired by the position information acquiring unit is stored in the material data storage unit 73 in association with the identification code 303 which itself is associated with the acquired identification information 100 or the auxiliary information 110.

Figure 8:
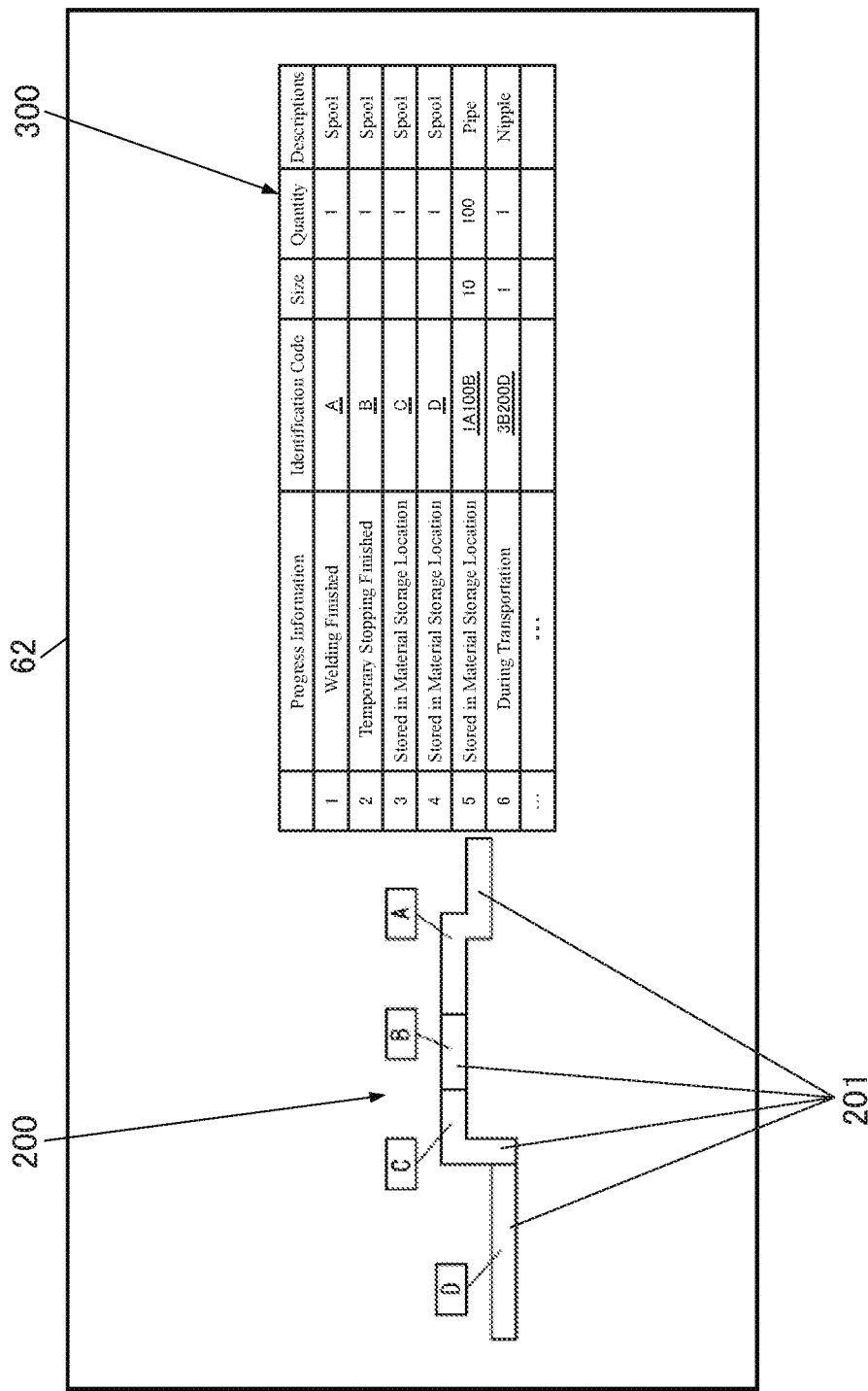
FIG. 8 is a diagram showing a display example of display unit of the terminal device.

FIG. 8 shows a display example of the display unit 62. The display unit 62 displays the material table 300 and the CAD diagram 200 and also displays the identification code 303 associated with the element diagram 201 used in the CAD diagram 200, in a manner such that the association can be known.

At this time, the display unit 62 changes the color in response to the progress information 302 associated with the element diagram 201 and displays the same. For example, if the progress information 302 associated with the element diagram 201 shows a finished welding, the color is changed to, for example, blue. On the other hand, if the progress information 302 shows a finished temporary stopping, the color is changed to, for example, red.

The material code table 300 displayed by the display unit 62 or the identification code 303 contained in the CAD diagram 200 is selected by the touch of the human operator. Once an arbitrary identification code 303 is selected, the progress information 302 associated with the selected identification code 303 is retrieved by the retrieval unit 77 from the material data storage unit 73.

If the retrieved progress information 302 is in a state inputted from the terminal 60, such as finished welding, finished temporary stopping, etc., the display unit 62 will display the second image associated with the selected identification code 303.

If the status of the retrieved progress information 302 indicates that material is stored in this material storage location, the retrieval unit 77 will retrieve the first position information associated with the selected identification code 303. Then, the display unit 62 retrieves, from the position information associated with the material map, the position information which is consistent with or approximates to the retrieved first position information, and displays the material map by flashing points having this position information on the material map.

The terminal 60 may be a portable device or a wearable smart device such as a smartphone. For example, an application software for implementing the present invention may be installed into a smartphone, and an external RFID reader may be attached to the smartphone and used as the terminal 60.

Figure 9:
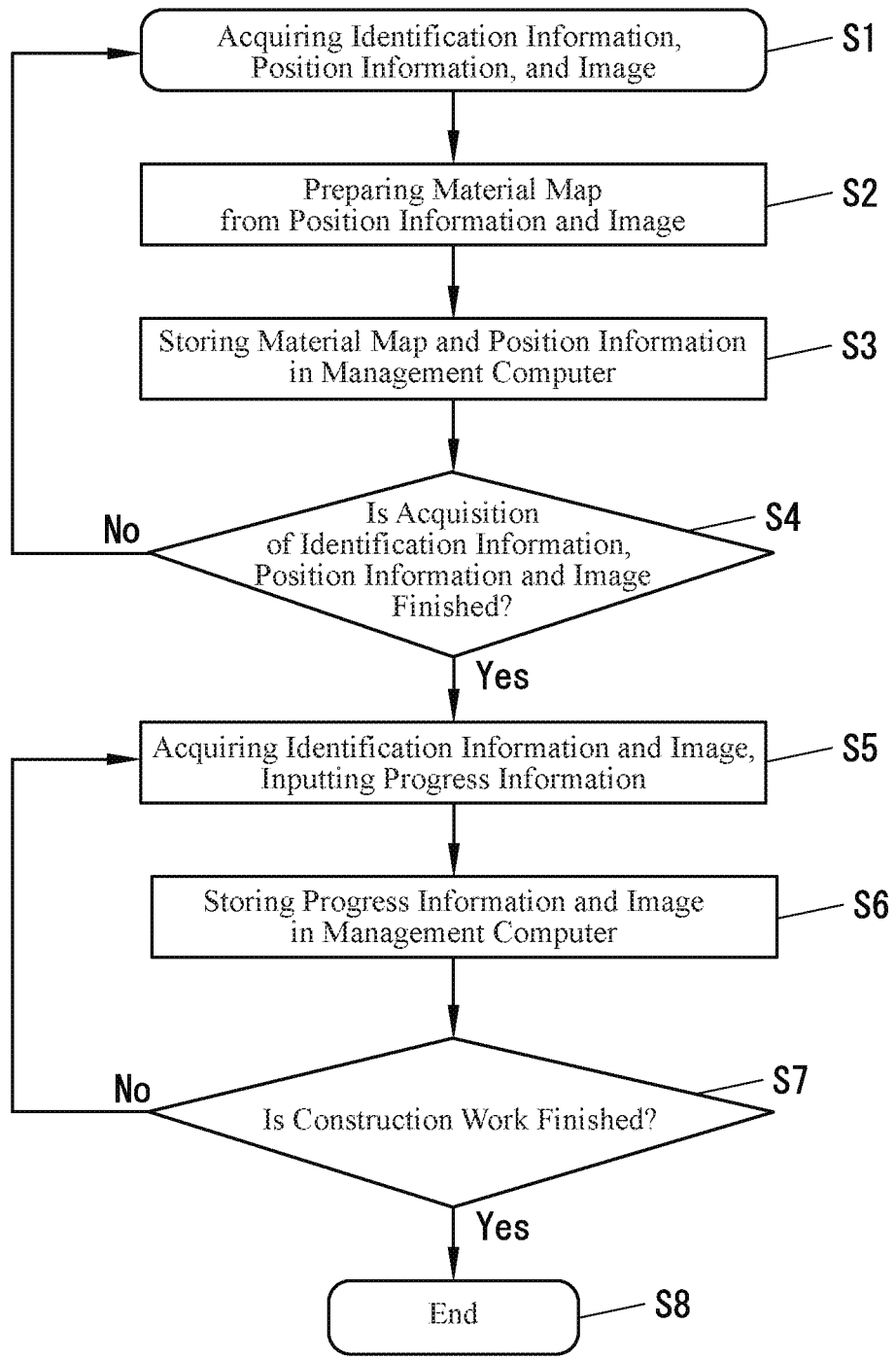
FIG. 9 is a flowchart explaining a process of obtaining information on construction, material.

Next, with reference to a flowchart shown in FIG. 9, description will be given to a process for acquiring information on construction material, which is performed in the construction material management system having the above-described structure. FIG. 9 shows a process of acquiring information for one arbitrary construction material.

First, in step S1, the moving body 20 and the image acquiring/moving body 30 acquire the identification information 100, the first position information, the second position information, and the first image.

Next, in step S2, the material map preparing unit 55 prepares a material map from the first image and the second position information acquired in step S1.

Next, in step S3, the material map storage unit 74 stores the material map prepared in step S2. Further, the first position information acquired in step S1 is stored in the storage unit 73, in association with the identification code 303 associated with the identification information 100 stored in the material data storage unit 73, which is the same as the identification information 100 acquired in step S1.

At a predetermined time or when it is necessary to update the material map or the first position information or the like, the moving body 20 or the image acquiring/moving body 30 will fly through the storage location 1 or the like, thus obtaining the identification information 100 and the first position Information, or the second position information and the first image. Therefore, when the construction material is stored in the storage location 1 or the like, which is in the flight route of the moving body 20 or the image acquiring/moving body 30, the identification information 100, the first position information, the second position information, or the first image can be obtained anytime, thus updating the first position information in the material map and the material data storage unit 73 (steps S1 to S4).

However, it is not absolutely necessary to perform, at the same time, the acquisition of the identification information 100 and the first position information by the moving body 20 and the acquisition of the second position information and the first image by the image acquiring/moving body 30. These acquisitions may be carried out at any arbitrary timings.

Also, as described above, the moving body 20 and the image acquiring/moving body 30 may be integrated together, but also in this case, the acquisition of the identification information 100 and the first position information, as well as the acquisition of the second position information and the first image may be performed at the same time or at different timings.

When the construction material is used in construction, the construction material will deviate from the flight route of the moving body 20, and acquisition of the identification information 100 and the first position, information by the moving body 20 will be stopped.

Subsequently, in step S5, the terminal 60 acquires the identification information 100 or the auxiliary information 110 and acquires the second image. At this time, the human, operator selects the element diagram 201 corresponding to the construction material used in construction from among the element diagrams 201 on the CAD diagram 200 displayed by the terminal 60, from among the element diagrams 201 displayed by the terminal 60. Then, the human operator selects one of the selection input options of the progress information 302 displayed by the display unit 62, and the input unit 65 inputs the progress information 302 corresponding to this selection.

Next, in step S6, the material data storage unit 73 stores the second image and the progress information 302 acquired in step S5, in association with the identification code 303 which itself is associated with the element diagram 201 selected in step S5.

Each time construction is performed, the terminal 60 acquires the identification information 100 or the auxiliary information 110 and acquires the second image and inputs the progress information 302. At this time, the human operator selects the element diagram 201 corresponding to the construction material used in the construction from among the element diagrams 201 on the CAD diagram 200, and the material data storage unit 73 stores the second image and the progress information, in association with the identification code 303 which itself is associated with the selected element diagram 201 (Steps S5 to S7).

When all the construction works to be done with respect to the now objective construction material is finished, the acquisition of the information relating to the construction material is also ended (step S8).

As described above, according to the present embodiment, when the construction material is stored in the storage location 1 or the like, the moving body 20 acquires the first position information which is information indicating the current position of the moving body 20 and acquires the identification information 100. That is, the moving body 20 acquires the position of the construction material identified by the identification information 100.

Further, the material map preparing unit 55 prepares a material map from, the second, position information and the first image acquired by the image acquiring/moving body 30.

The display unit 62 retrieves, from the position information associated, with the material map, position information which is consistent with or approximates to the first position information associated with the arbitrary identification information 100, and causes the flashing of points on the material map having this position information, and thus displays the material map.

Therefore, it is possible to obtain the latest position information of the construction material simply by causing the moving body 20 to fly. Further, it is possible to visually confirm a location storing the construction material from the material map displayed by the display unit 62. In this way, a person looking for construction material can easily find his desired, construction material.

Further, the element diagram 201 stored in the diagram storage unit 75 is associated with the identification code 303, while the identification code 303 is associated with the identification information 100 or is associated with both the identification information 100 and the auxiliary information 110. Then, the display unit 62 changes the color of the element diagram 201 in response to the progress information 302 associated, with the identification code 303 which itself is associated with the element diagram 201 used in the CAD diagram 200, and thus displays the CAD diagram 200.

Therefore, it is possible to visually confirm, from the CAD diagram 200 displayed on the display unit 62, what kind of state in which a specific construction material is, thus ascertaining a progress situation of the entire construction work.

Further, the terminal 60 acquires the progress information 302 and the second image, while the material data storage unit 73 stores the progress information 302 and the second image in association with the identification code 303.

Therefore, the human operator can use the terminal 60 to store the progress information 302 of the construction work together with an image showing the progress information 302 in the material data storage unit 73.

Further, when displaying the CAD diagram 200, the display unit 62 displays the identification code 303 associated with the element diagram 201 used in the CAD diagram 200 such that the association can be known, and displays the material table 300. Then, once the human operator touches the material table 300 or the identification code 303 included in the CAD diagram 200 displayed on the display unit 62, the display unit 62 will display the second image associated with the material map or the touched identification code 303, in response to the progress information 302 associated with the touched identification code 303.

Therefore, the user of the terminal 60 can confirm the progress status of the entire construction work and the next necessary construction material from the CAD diagram 200 displayed on the display unit 62, and can visually confirm a place where the next necessary construction material is stored by touching the identification code 303 of the next necessary construction material displayed on the display unit 62. Also, regarding construction materials that have already been used in construction, it is possible to visually check the second image to confirm whether construction was correctly done.

Therefore, it is possible to efficiently and accurately ascertain the progress situation, and to efficiently specify construction materials necessary for the next work.

Explanations of Reference Numerals 1 storage location
10 identification information holding medium
20 moving body
21 first position information acquiring unit
22 first identification information acquiring unit
30 image acquiring/moving body
31 second position information acquiring unit
32 first image acquiring unit
55 material map preparing unit
60 terminal
62 display unit
63 second image acquiring unit
64 second identification information acquiring unit
70 management computer
73 material data storage unit
74 material map storage unit
75 diagram storage unit
76 diagram associating unit
77 retrieval unit
100 identification information
200 CAD diagram
201 element diagram
302 progress information

The invention claimed is:

1. A construction material management system including:
an identification information holding medium that is attached to construction material and holds identification information for identifying the construction material;
a first moving body that moves around an area surrounding a storage location of the construction material, the first moving body configured to:
acquire first position information which is position information of the first moving body; and
while moving around the storage location, acquire the identification information via wireless communication from the identification information holding medium;
a management, computer including configured to:
store, in a storage device, the first position information in association with the identification information; and
retrieve the identification information from the storage device;
a second image acquiring/moving body that flies around the storage location of the construction material, the second image acquiring/moving body configured to:
acquire second position information which is position information of the second image acquiring/moving body, while the second image acquiring/moving body is flying around the storage location of the construction material; and
acquire an image of the construe on material or an image of a surrounding area including the storage location of the construction material;
a processor configured to:
prepare a material map that includes:
(i) the second position information or position information calculated from the second position information; and
(ii) the acquired image or a combined image prepared by combining a plurality of acquired images from the second image acquiring/moving body:
store the material map; and
display, on a display unit, simultaneously:
(i) the first position information stored in the storage device in association with the retrieved identification information; and
(ii) the material map, wherein:
the display unit visually indicates an expected current location of the construction material based on:
(i) the second position information or the position information calculated from the second position information in the material map; and
(ii) the first position information.

2. The construction material management system according to claim 1, wherein:
the management computer is configured to:
store a CAD diagram and an element diagram to be used in the CAD diagram;
associate the element diagram with the identification information; and
retrieve the identification information associated with said element diagram; and
the display unit displays the first position information associated with the retrieved identification information.

3. The construction material management system according to claim 1, comprising:
a terminal configured to:
acquire the identification information from the identification information holding medium; and
input progress information of construction work, wherein:
the progress information is stored in association with the identification information; and
the display unit displays the progress information associated with the retrieved identification information.

4. The construction material management system according to claim 1, wherein:
the management computer is configured to:
store a CAD diagram and an element diagram to be used in the CAD diagram; and
associate the element diagram with the identification information;
the construction material management system comprises a terminal that is configured to:
acquire the identification information from the identification information holding medium; and
input progress information of construction work;
the progress information is stored in association with the identification information;
the identification information associated with the element diagram is retrieved; and
the display unit changes a color of the element diagram and displays the CAD diagram in accordance with the progress information associated with the retrieved identification information.

5. The construction material management system according to claim 3, wherein:
the terminal is configured to acquire a second image that is an image of the construction material;
the second image acquired by the terminal is stored in association with the identification information; and
the display unit displays the second image associated with the retrieved identification information.

6. A construction material management method, comprising:
moving around a storage location of construction material by a first moving body;
acquiring identification information via wireless communication from an identification information holding medium attached to the construction material for holding the identification information for identifying the construction material;
acquiring first position information that is position information of the first moving body;
storing, in a storage device, the acquired first position information, in association with the identification information;
flying around the storage location of the construction material by a second image acquiring/moving body;
acquiring second position information which is position information of the second image acquiring/moving body;
acquiring a first image which is an image of an area surrounding the storage location of construction material or an image of the construction material;
combining the acquired second position information and the acquired first image to prepare a material map that includes:
(i) the acquired second position information; and
(ii) the acquired first image from the second image acquiring/moving body; storing the material map;
retrieving the identification information in the storage device; and
displaying, on a display unit, simultaneously:
(i) the first position information associated with the retrieved identification information; and
(ii) the material map, wherein:
the display unit visually indicates an expected current location of the construction material based on:
(i) the acquired second position information in the material map; and
(ii) the first position information.

7. The construction material management method according to claim 6, comprising:
associating an element diagram to be used in a CAD diagram with the identification information;
retrieving the identification information associated with the element diagram;
displaying the first position information associated with the retrieved identification information.

8. The construction material management method according to claim 6, comprising:
acquiring the identification information from the identification information holding medium;
inputting progress information of construction work;
storing the inputted progress information in association with the identification information; and
displaying the progress information associated with the retrieved identification information.

9. The construction material management method according to claim 6, comprising:
associating an element diagram to be used in a CAD diagram with the identification information;
acquiring the identification information from e identification information holding medium;
inputting progress information;
storing the inputted progress information in association with the identification information;
retrieving the identification information associated with the element diagram; and
changing a color of the element diagram and displaying the CAD diagram in accordance with the progress information associated with the retrieved identification information.

10. The construction material management method according to claim 8, comprising:
storing a second image that is an image of the construction material, in association with the identification information; and
displaying the second image associated with the retrieved identification information.

* * * * *